United States Patent
Mugglestone

(10) Patent No.: US 9,919,391 B2
(45) Date of Patent: Mar. 20, 2018

(54) METHOD FOR MANUFACTURING A TURBINE ASSEMBLY

(71) Applicant: Siemens Aktiengesellschaft, Munich (DE)

(72) Inventor: Jonathan Mugglestone, Brinsley (GB)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 298 days.

(21) Appl. No.: 14/431,949

(22) PCT Filed: Aug. 23, 2013

(86) PCT No.: PCT/EP2013/067527
§ 371 (c)(1),
(2) Date: Mar. 27, 2015

(87) PCT Pub. No.: WO2014/053272
PCT Pub. Date: Apr. 10, 2014

(65) Prior Publication Data
US 2015/0266143 A1 Sep. 24, 2015

(30) Foreign Application Priority Data
Oct. 5, 2012 (EP) .................................... 12187429

(51) Int. Cl.
| | |
|---|---|
| *B23P 15/02* | (2006.01) |
| *C23C 4/00* | (2016.01) |
| *F01D 5/18* | (2006.01) |
| *F01D 9/04* | (2006.01) |
| *F01D 5/14* | (2006.01) |
| *F01D 5/28* | (2006.01) |

(52) U.S. Cl.
CPC ................ *B23P 15/02* (2013.01); *C23C 4/00* (2013.01); *F01D 5/147* (2013.01); *F01D 5/186* (2013.01);
(Continued)

(58) Field of Classification Search
CPC .... C23C 4/01; C23C 4/02; C23C 8/04; C23C 10/04; C23C 14/04; C23C 14/042;
(Continued)

(56) References Cited

U.S. PATENT DOCUMENTS 6,265,022 B1 * 7/2001 Fernihough ............... F01D 5/28
29/889.1
6,749,396 B2 * 6/2004 Barry ...................... F01D 5/186
415/115
(Continued)

FOREIGN PATENT DOCUMENTS

| | | |
|---|---|---|
| CN | 101638996 | 2/2010 |
| EP | 1544414 A1 | 6/2005 |

(Continued)

*Primary Examiner* — Logan Kraft
*Assistant Examiner* — Peter T Hrubiec
(74) *Attorney, Agent, or Firm* — Beusse Wolter Sanks & Maire

(57) ABSTRACT

A method for manufacturing a turbine assembly, which includes at least two aerofoils arranged adjacent towards each other and embodied as a twin vane segment, is provided. The method includes: processing the turbine assembly with a first protection technique providing a first protection for the at least two adjacent aerofoils, wherein at least one region of one aerofoil remains unprocessed; preprocessing of the at least one region that will remain unprocessed or post-processing of the at least one region that remained unprocessed with a second protection technique to provide a second protection for the at least one region of the one aerofoil, wherein the first and the second protection techniques differ from one another.

7 Claims, 3 Drawing Sheets

(52) U.S. Cl.
CPC .............. *F01D 9/041* (2013.01); *F01D 5/288* (2013.01); *F05D 2240/121* (2013.01); *F05D 2240/124* (2013.01); *F05D 2260/202* (2013.01); *Y10T 29/49321* (2015.01)

(58) Field of Classification Search
CPC ....... C23C 16/04; C23C 16/042; C23C 18/06; C23C 18/1603; C23C 18/1605; C23C 18/1608; F01D 5/286
See application file for complete search history.

(56) References Cited

U.S. PATENT DOCUMENTS

| | | | |
|---|---|---|---|
| 7,008,178 B2 * | 3/2006 | Busch | F01D 5/189 |
| | | | 415/115 |
| 8,157,515 B2 | 4/2012 | Bailey et al. | |
| 8,197,184 B2 * | 6/2012 | Chon | F01D 5/185 |
| | | | 415/115 |
| 2003/0172530 A1 | 9/2003 | Jonsson et al. | |
| 2004/0180232 A1 * | 9/2004 | Das | C23C 10/02 |
| | | | 428/610 |
| 2005/0111965 A1 | 5/2005 | Clarke | |
| 2005/0135920 A1 | 6/2005 | Trindade | |
| 2007/0036997 A1 * | 2/2007 | Floyd | C04B 35/486 |
| | | | 428/472 |
| 2008/0095635 A1 | 4/2008 | Chon | |
| 2008/0124210 A1 | 5/2008 | Wayte et al. | |
| 2010/0124508 A1 | 5/2010 | Liang | |

FOREIGN PATENT DOCUMENTS

| | | |
|---|---|---|
| EP | 1916388 A2 | 4/2008 |
| RU | 2266803 C2 | 12/2005 |
| RU | 2007144107 A | 6/2009 |
| WO | 2011026503 A1 | 3/2011 |

* cited by examiner

METHOD FOR MANUFACTURING A TURBINE ASSEMBLY

CROSS REFERENCE TO RELATED APPLICATIONS

This application is the US National Stage of International Application No. PCT/EP2013/067527 filed Aug. 23, 2013, and claims the benefit thereof. The International Application claims the benefit of European Application No. EP12187429 filed Oct. 5, 2012. All of the applications are incorporated by reference herein in their entirety.

FIELD OF THE INVENTION

The present invention relates to a method for manufacturing a turbine assembly, which comprises at least two aerofoils that are arranged adjacent towards each other and to a turbine assembly for high temperature applications manufactured according to such a method.

BACKGROUND TO THE INVENTION

Modern gas turbines often operate at extremely high temperatures. The effect of temperature on the turbine blades and/or stator vanes can be detrimental to the efficient operation of the turbine and can, in extreme circumstances, lead to distortion, oxidation and possible failure of the blade or vane. In order to overcome this risk, components, like blades or stator vanes, of high temperature turbines may be coated with a thermal barrier coating (TBC).

Often, blades and vanes are designed as single components allowing them to be coated individually to obtain satisfactory coating results. This leads to a higher number of parts to handle and also increased cost. Thus, to reduce time and costs as well as to provide an assembly with a low leakage flow and that is more stable in assembly and operation multiple aerofoils are processed in a single casting. When coating such a casting, using a so called line-of-sight coating approach the quality of the coating in some areas can be poor.

Problems arise in this approach when the aerofoils of the turbine assembly are arranged in such a way that specific regions of one or several aerofoils are covered or blocked by another aerofoil during the coating process. This creates so-called Blind spots where local uncertainty with the coating quality and thickness may occur. This may negatively affect the life and integrity of the component due to excessive temperature for the state of the surface or coating.

It is a first objective of the present invention to provide an advantageous method for manufacturing a turbine assembly, which comprises at least two aerofoils that are arranged adjacent towards each other. A second objective of the invention is to provide a thus manufactured and advantageous turbine assembly for high temperature applications.

SUMMARY OF THE INVENTION

Accordingly, the present invention provides a method for manufacturing a turbine assembly, which comprises at least two aerofoils that are arranged adjacent towards each other.

It is provided that the method comprises at least the following steps: processing the turbine assembly with a first protection technique that provides a first protection for the at least two adjacent aerofoils, wherein at least one region of one aerofoil of the at least two adjacent aerofoils remains unprocessed, pre-processing of the at least one region of the one aerofoil of the at least two adjacent aerofoils that will remain unprocessed by the processing with the first protection technique or post-processing of the at least one region of the one aerofoil of the at least two adjacent aerofoils that remained unprocessed by the processing with the first protection technique with a second protection technique that provides a second protection for the at least one region of the one aerofoil of the at least two adjacent aerofoils that will remain unprocessed or that remained unprocessed, wherein the first and the second protection techniques differ from one another.

Due to the inventive matter a proper and reliable protection of the aerofoils of the turbine assembly can be provided. Moreover, with this inventive method uncertainties relating to the first processing technique within the at least one region of the one aerofoil of the at least two adjacent aerofoils that will remain unprocessed or that remained unprocessed, a so-called blind-spot region, may be minimised and advantageously be completely removed. Additionally, aerodynamic/performance losses can be minimised. This leads to an improved engine performance. With the use of such a method and a thus manufactures turbine assembly, conventional state of the art precision castings of aerofoils, e.g. rotor blades and stator vanes, could be used by retrofitting existing components or implementing additional structures, for example. Hence, intricate and costly reconstruction of these aerofoils and changes to a casting process could be omitted. Consequently, an efficient turbine assembly or turbine, respectively, could advantageously be provided.

As it is obvious from the structuring of the method the processing of the turbine assembly with the first protection technique may be performed before or after the second protection technique. A turbine assembly is intended to mean an assembly provided for a turbine, like a gas turbine, wherein the assembly possesses at least two aerofoils. Advantageously, the turbine assembly has a turbine cascade and/or wheel with circumferential arranged aerofoils and/or may have an outer and an inner platform arranged at opponent ends of the aerofoil(s). The wording "two adjacent aerofoils" should be understood as the shortened term of the wording "two aerofoils that are arranged adjacent towards each other". Furthermore, the wording "the at least one region of the at least two adjacent aerofoils that will remain unprocessed or that remained unprocessed" will be referred to as "the unprocessed region" for better readability in the following description. Moreover, the terms "unprocessed region" and "Blind-spot region" will be used as synonyms towards each other. Moreover, a protection technique is intended to mean any technique that is feasible for a person skilled in the art that provides protection against a negative condition, effect and/or aggressor, e.g. heat, humidity, radiation, acidity and/or any other condition, effect and/or aggressor that seems suitable for a person skilled in the art. Consequently, the protection may be a heat protection, an anti-corrosive protection and/or an anti-reflecting protection, for example. A difference in the first and the second protection technique is intended to mean that the techniques use and/or have different functional principle. In particular, the difference should not lie in a divergent processing time or a use of different substances, like different coatings or radiation.

According a further advantageous aspect of the invention the first protection technique is a heat protection technique, thus providing protection for a commonly known problem in the field of high temperature applications, like gas turbines. Advantageously, the second protection technique is a heat protection technique. Hence, regions with low cooling properties may be avoided, resulting in a significant improvement in aerofoil cooling efficiency while minimising performance losses.

In general it would also be possible, to deploy two different protection techniques. For example, it may be feasible to use as the first protection technique a heat protection technique and as the second protection technique an anti-reflecting protection technique or vice versa.

In an embodiment, the first protection technique, and specifically the first heat protection technique, is a coating process of the turbine assembly. By means of this the heat protection can be applied constructively easy. Advantageously, the first protection technique, and specifically the first heat protection technique, is a line-of-sight coating process of the turbine assembly. Thus, a process can be used by which multiple aerofoils can be processed in a single casting—being a monolithic piece—resulting in cost savings, low leakage flow and a turbine assembly that is more stable in assembly as well as in operation.

It may be further of advantage when the at least one unprocessed region is arranged in a leading edge region of the aerofoil. Consequently, a region which is exposed to a highly detrimental environment may be efficiently protected. Moreover, the unprocessed region is arranged in an intersection between a leading edge and a suction side of the aerofoil. Due to this, the at least two adjacent aerofoils may be arranged in a highly aerodynamic manner and have an efficient protection against detrimental effects, however.

In addition, it is advantageous when the second protection technique provides at least one modification of the unprocessed region. Hence, negative effects of a blind spot region may be purposefully and beneficially avoided. For example, local uncertainty with a coating quality and thickness, affecting the life and integrity of the component due to excessive temperature for the state of the surface or coating may be minimised. In this context a modification is intended to mean any change and/or alteration that is feasible for a person skilled in the art that changes at least a property of the region, e.g. a resistance against heat, corrosion, reflection or the like. The modification may be a surface alteration, like an applied coating, an etching, a roughening and/or an application of at least one specific structure, e.g. a groove or a recess, or an insertion of holes or the like. In general, it would also be possible to cause a chemical conversion, e.g. by a physical, chemical and/or biological treatment with radiation or an acid, for example.

Alternatively and/or additionally, the second protection technique provides an arrangement of at least one additional piece at the unprocessed region. This arrangement removes the life and temperature uncertainties relating to processing, e.g. coating, uncertainties within a Blind-spot region, while minimising the cooling consumption and associated gas path aerodynamic losses, leading to improved engine performance. An additional piece is intended to mean a piece that is embodied separately from the aerofoil and especially from a casing of the aerofoil. In particular, the additional piece and the aerofoil are not formed integrally with each other.

In a further refinement the second protection technique, and specifically the second heat protection technique, provides a cooling structure in and/or at the unprocessed region. Thus, the cooling may be obtained with a simple and easy to construct and implemented means. In this context, a cooling structure is intended to mean any structure, device and/or plurality of the same structure or different structures that is/are feasible for a person skilled in the art and which provide(s) cooling of the unprocessed region. The cooling structure may be embodied e.g. as a hole, like a film cooling hole, a groove, an impingement tube or the like.

Favourably, the second protection technique, and specifically the second heat protection technique, provides a film cooling effect at the unprocessed region. By means of this an efficient cooling strategy may be employed. The film cooling effect may be provided by any means suitable for a person skilled in the art that causes a film cooling or that discharges cooling medium, e.g. air, which provides a thin, cool, insulating blanket along an external surface of the aerofoil. The phrase "provides/causes a film cooling/film cooling effect" is intended to mean that the means is intended, primed, designed and/or embodied to provoke and/or mediate a film cooling. This means may be a slot, a hole or a plurality of slots and/or holes.

According to an embodiment the at least one modification of the unprocessed region and/or the cooling structure is at least one column of film cooling holes. Due to this, a construction can be used that affects the integrity of the aerofoil only slightly even so providing efficient cooling.

Alternatively and/or additionally, an efficient and effective cooling can be achieved when the at least one additional piece at the unprocessed region and/or the cooling structure is at least one impingement tube. In comparison to state of the art systems a more efficient cooling can be achieved. Moreover, the refitting of an impingement tube in existing components is advantageously uncomplicated and easy. In this context, an impingement tube is a piece that is constructed independently from the aerofoil and/or is another and/or an additional piece then the aerofoil and/or isn't formed integrally with the aerofoil.

In a further advantageous embodiment the aerofoil is a turbine blade or vane, for example a nozzle guide vane.

Moreover, a turbine assembly, which comprises at least two aerofoils that are arranged adjacent towards each other, manufactured according to the inventive method is provided. Due to the inventive matter a proper and reliable protection of the aerofoils of the turbine assembly can be provided. Moreover, uncertainties relating to the first processing technique within the unprocessed region—the Blind-spot region, may be minimised and advantageously be completely removed. Additionally, aerodynamic/performance losses can be minimised. This leads to an improved engine performance. With the use of such a turbine assembly, conventional state of the art precision castings of aerofoils, e.g. rotor blades and stator vanes, could be used by retrofitting existing components or implementing additional structures, for example. Hence, intricate and costly reconstruction of these aerofoils and changes to a casting process could be omitted. Consequently, an efficient turbine assembly or turbine, respectively, could advantageously be provided.

According to an embodiment the turbine assembly includes at least one twin aerofoil segment, which comprises the two adjacent aerofoils manufactured according to the inventive method, wherein one aerofoil comprises at least one cooling structure provided according to the second protection technique, and specifically the second heat protection technique. Hence, the twin aerofoils or even multiple aerofoils may be manufactured and/or processed in a single casting, resulting in possible cost savings, lower leakage flow and a more stable assembly as well as a reliable operation.

Advantageously, the other aerofoil lacks a cooling structure. In embodiments where all aerofoils and in an twin aerofoil segment both aerofoils are embodied with film cooling holes is this at an expanse of extra cooling consumption together with an associated aerodynamic loss. Thus, to provide only one aerofoil of the twin aerofoil segment or every second aerofoil in a turbine cascade or wheel with a cooling structure such factors may favourably be minimised. Moreover, such a non-periodic pattern or biased (film) cooling also minimises the number of cooling structures, e.g. film cooling holes, or the needed manufacturing equipment and/or time and thus saving on manufacturing costs.

The above-described characteristics, features and advantages of this invention and the manner in which they are achieved are clear and clearly understood in connection with the following description of exemplary embodiments which are explained in connection with the drawings.

BRIEF DESCRIPTION OF THE DRAWINGS

The present invention will be described with reference to drawings in which.

DETAILED DESCRIPTION THE ILLUSTRATED EMBODIMENTS

In the present description, reference will only be made to a twin aerofoil segment embodied as a double vane segment, for the sake of simplicity, but it is to be understood that the invention is applicable to both blades and vanes of a turbine.

Figure 1:
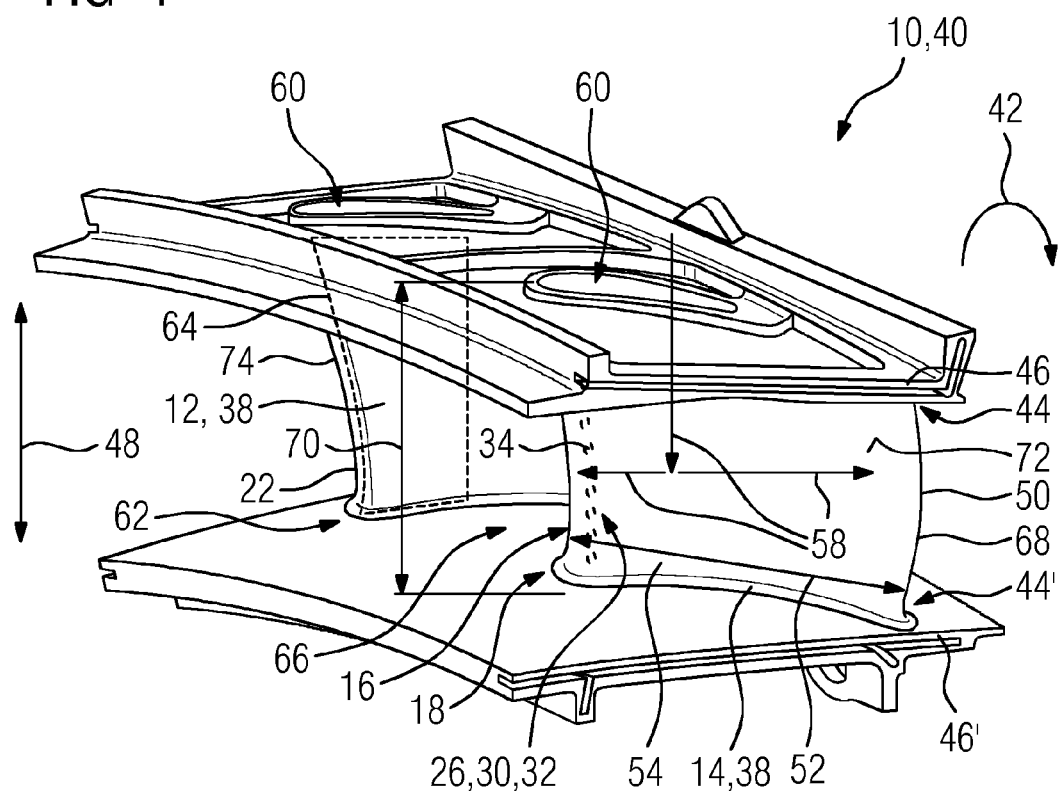
FIG. 1: shows a perspective view of a turbine assembly with a twin aerofoil segment comprising film cooling holes in one aerofoil.

FIG. 1 shows a perspective view of a turbine assembly 10. The turbine assembly 10 comprises a turbine cascade with a plurality of twin aerofoil segments 40 arranged one after the other in a circumferential direction 42 of the turbine cascade (not shown), wherein one twin aerofoil segment 40 is exemplarily shown in FIG. 1. A turbine assembly 10 or the twin aerofoil segment 40 comprises two aerofoils 12, 14 that are arranged in circumferential direction 42 adjacent towards each other. Thus, each aerofoil 12, 14 is embodied as a turbine vane 38. At two radial ends 44, 44' of each aerofoil 12, 14, wherein the ends 44, 44' are arranged opposed towards each other at the aerofoil 12, 14 an outer and an inner platform 46, 46' are arranged. The outer platform 46 and the inner platform 46' are oriented basically perpendicular to a span wise direction 48 of each aerofoil 12, 14. In the circumferential direction 42 of a not shown turbine cascade several aerofoils 12, 14 could be arranged, wherein all aerofoils 12, 14 where connected through the outer and the inner platforms 44, 44' with one another. It should be noted, that in the scope of an arrangement of the platform as "basically perpendicular" to a span wise direction 48 should also lie a divergence of the orientation of the platforms 44, 44' in respect to the span wise direction 48 of about 45°. A span wise direction 48 of the aerofoils 12, 14 is defined as a direction extending basically perpendicular, advantageously perpendicular, to a direction from a leading edge 22 to a trailing edge 50 of each aerofoil 12, 14, the latter direction is also known as a chord wise direction of an aerofoil. In the following text this direction is referred to as the axial direction 52.

The twin aerofoil segment 40 is built monolithically so that all further processing steps need to be executed on the twin aerofoil segment 40. One aerofoil can not be removed from the twin aerofoil segment 40.

Figure 2:
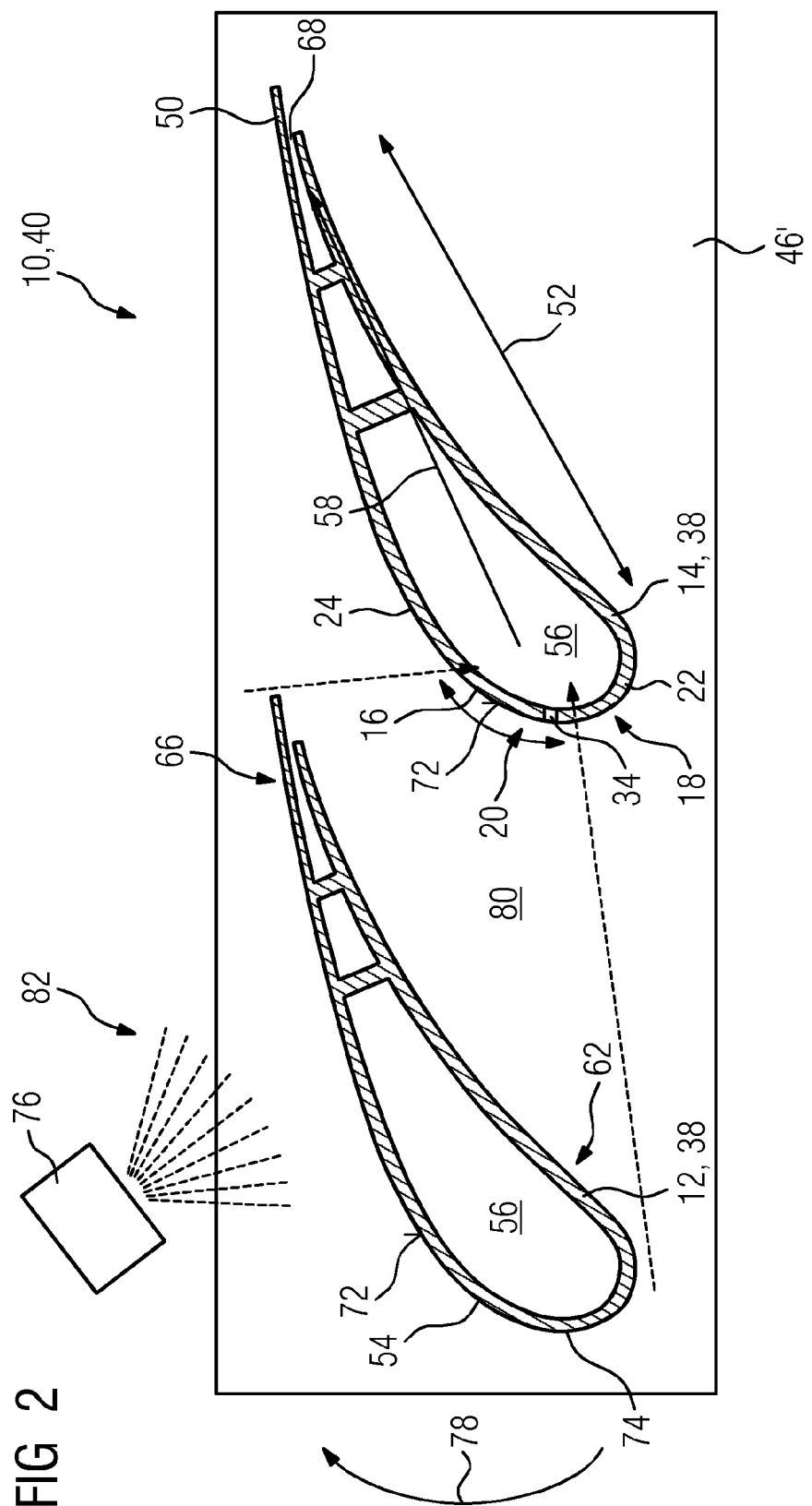
FIG. 2: shows in a schematically cross section an arrangement of the twin aerofoil segment from FIG. 1 during a processing with a first protection technique and, FIG. 3: shows a perspective view of an alternative twin aerofoil segment with an impingement tube inserted into one aerofoil.

Each aerofoil 12, 14 has a casing 54 that encases at least one cavity 56 and thus is embodied as a basically hollow aerofoil (see FIG. 2). This construction provides a flow path 58 for a cooling medium, e.g. air discharged from a compressor of the gas turbine (not shown). During operation the cooling medium enters the cavity 56 via an aperture 60, which is arranged in the outer platform 44 at a side oriented towards the leading edge 22 of each aerofoil 12, 14. Generally, it would also be possible to embody the inner platform 44' or both platforms 44, 44' with an aperture 60 or a plurality of apertures 60 in any region between the leading edge 22 and the trailing edge 50.

Inside the cavity 56 and during operation of the gas turbine engine the cooling medium travels through two state of the art cooling regions of the aerofoil 12, 14, specifically, an impingement cooling region 62, embodied with an impingement tube 64 (exemplarily shown in dashed lines only in aerofoil 12), and a pin-fin/pedestal cooling region 66. The former is located at the leading edge 22 and the latter at the trailing edge 50 of each aerofoil 12, 14. To exit the cavity 56 the lions share of the cooling medium is exhausted through apertures 68 at the trailing edge 50 of each aerofoil 12, 14 (see FIG. 2). The trailing edge 50 may also be provided with film cooling holes as exemplarily shown in aerofoil 14 of FIG. 3.

One of the two aerofoils 14 comprises a cooling structure 30 in a leading edge region 18 of the aerofoil 14, wherein this region 18 is an intersection 20 between the leading edge 22 and a suction side 24 of the aerofoil 14 (see also FIG. 2). The cooling structure 30 is embodied as a column 32 of film cooling holes 34, shown in dashed lines in FIG. 1 since they are hidden in this view. For the precise position refer to FIG. 2. The column 32 extends in span wise direction 48 along a whole span 70 of the aerofoil 14. For cooling of the region 16 cooling medium exits the aerofoil 14 and builds a thin, cool, insulating blanket along an external surface 72 of the aerofoil 14. Generally, it would also be feasible if more than one column 32 of film cooling holes 34 would be provided and that the column 32 would extend only along a part of the span 70 of the aerofoil 14. Moreover, a number of film cooling holes 34 per column 32 may be any number feasible for a person skilled in the art. Furthermore, a shape of a film cooling hole 34 may be any shape feasible for a person skilled in the art, like round, elliptic, rectangular etc. A corresponding area 74 in the leading edge region 18 of the other aerofoil 12, in turn, lacks a cooling structure 30 or film cooling holes 34, respectively.

On the basis of FIG. 2, which shows in a schematically cross section an arrangement of the twin aerofoil segment 40 during a processing or a manufacturing of the turbine assembly 10 will be described.

During the manufacturing the turbine assembly 10 is processed with a first protection technique that provides a first protection for the aerofoils 12, 14. This first protection technique is a heat protection technique and specifically a line-of-sight coating process of the turbine assembly 10. During that coating process a schematically shown spray device 76 of a not shown processing unit moves in direction 78 around the twin aerofoil segment 40 to apply a not depicted heat protection coating, like a TBC (thermal barrier coating), on the surface 72 of the aerofoils 12, 14. In general, it would also be possible to rotate the turbine assembly 10 in direction 78 or to employ a plurality of spray devices 76, arranges all around the turbine assembly 10 (not shown).

As could be seen from FIG. 2 the aerofoils 12, 14 are arranged in reference to the spray device 76 in such a way that at least one region 16 of one aerofoil 14 is in a shadow zone 80 of the other aerofoil 12. The region 16 is defined by the extension of the aerofoil 12 in axial direction 52 or from its leading edge 22 to its trailing edge 50. Therefore, the covered and thus unprocessed region 16 is arranged in the leading edge region 18 of the aerofoil 14 or the intersection 20 between the leading edge 22 and the suction side 24, respectively.

Due to this arrangement, the aerofoil 12 is blocking a path 82 of the sprayed coating and thus preventing the application of the coating to region 16 on the other aerofoil 14. Consequently, the region 16 of the aerofoil 14 of the two adjacent aerofoils 12, 14 remains unprocessed. Due to the lack of heat protection coating in the region 16, a so-called blind-spot region (see arrow), this region 16 would be prone to detrimental effects, like high temperatures.

To solve this problem, the region 16 of the one aerofoil 14 of the at least two adjacent aerofoils 12, 14 that remained unprocessed by the processing with the first protection technique is post-processed with a second protection technique that provides a second protection for the unprocessed region 16 of the aerofoil 14. This second protection technique is also a heat protection technique and specifically, a modification 26 of the unprocessed region 16. Hence, the first and the second protection techniques differ from one another.

This modification 26 of the unprocessed region 16 is the cooling structure 30 or the column 32 of film cooling holes 34, respectively. Consequently, the second protection technique provides a film cooling effect at the unprocessed— un-coated—region 16. The film cooling holes 34 may be inserted into the unprocessed region 16 by the post-processing by any process feasible for a person skilled in the art, e.g. drilling, burning or etching. In addition, any position and/or location in the unprocessed region 16 would be feasible.

It is advantageous if the film cooling holes 34 are placed in a position or upstream but adjacent to a position which can not be properly spray coated. Particularly it is advantageous if the cooling holes 34 on one of the aerofoils (14) are aligned such that they point to the leading edge section of the other aerofoil 12 which is monolithically connected to the aerofoil 14 that comprises the film cooling holes 34.

By using a well-known technique and by knowing the geometry of the turbine assembly 10 and its arrangement in the processing unit it would alternatively also be possible to pre-processes the region 16 of the one aerofoil 14 of the at least two adjacent aerofoils 12, 14 that will remain unprocessed by the processing with the first protection technique. Therefore, the processing of the turbine assembly 10 with the first protection technique that provides a first protection, wherein the region 16 of one aerofoil 14 remains unprocessed, will be performed timely after the pre-processing with the second protection technique.

Figure 3:
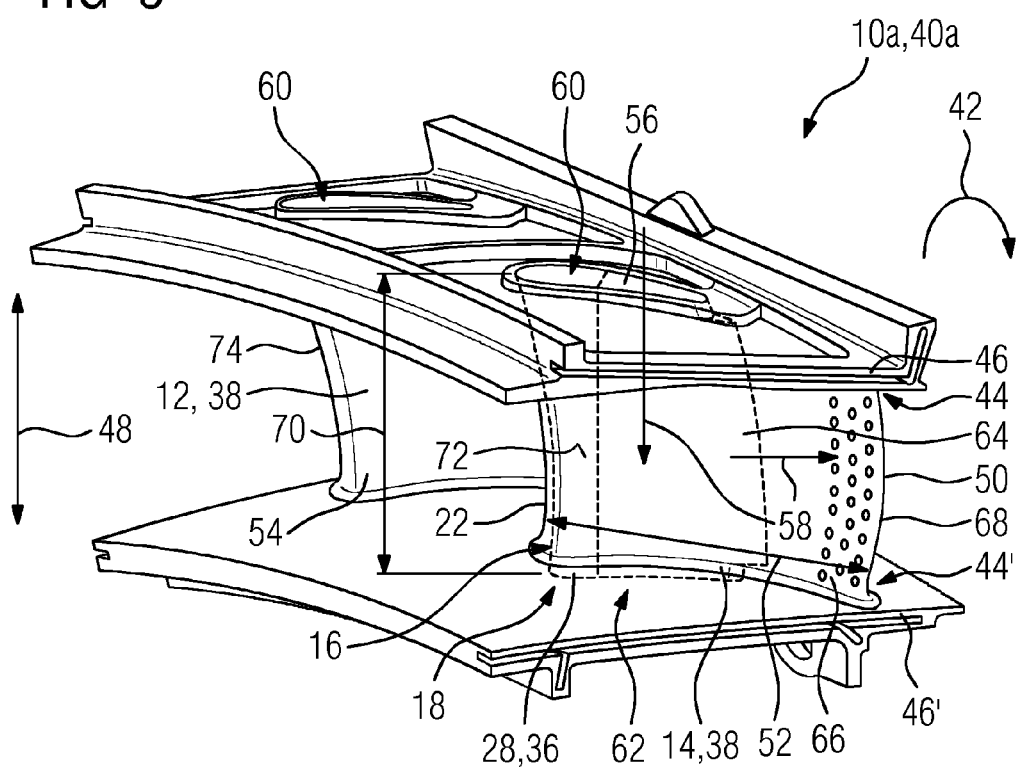

In FIG. 3 an alternative embodiment of the turbine assembly 10 is shown. Components, features and functions that remain identical are in principle substantially denoted by the same reference characters. To distinguish between the embodiments, however, the letter "a" has been added to the different reference characters of the embodiment in FIG. 3. The following description is confined substantially to the differences from the embodiment in FIGS. 1 and 2, wherein with regard to components, features and functions that remain identical reference may be made to the description of the embodiment in FIGS. 1 and 2.

FIG. 3 shows a perspective view of an alternative twin aerofoil segment 40a. The turbine assembly 10a or the twin aerofoil segment 40a of FIG. 3 differs from the turbine assembly 10 or the twin aerofoil segment 40 of FIG. 1 in that, the second protection technique provides an arrangement of an additional piece 28 at the unprocessed region 16. This additional piece 28 is a cooling structure 30 embodied as an additional impingement tube 36, which is inserted only into one aerofoil 14 of the turbine assembly 10a in a leading edge region 18 of the aerofoil 14. Another aerofoil 12 of the twin aerofoil segment 40a lacks an additional cooling structure 30 or an additional impingement tube 36, respectively. A trailing edge 50 may be provided with film cooling holes as exemplarily shown in aerofoil 14. An impingement cooling region 62 of the aerofoils 12, 14 may be embodied with an impingement tube 64 (exemplarily shown in dashed lines only in aerofoil 14).

As said, the invention is also directed to a turbine assembly, which comprises at least two aerofoils that are arranged adjacent towards each other and between two platforms, the at least two aerofoils and the two platforms are formed monolithically, wherein only a first one of the at least two aerofoils comprises at least one column of film cooling holes and wherein a second one of the at least two aerofoils is free of film cooling holes. This is advantageous as the film cooled region of the first aerofoil downstream of the film cooling holes may not require a thermal barrier coating.

Therefore the coating process can be simplified as that regions that can not easily be coated via spraying can be left and do not need to be coated as film cooling is present in that area. As a result, when twin vane segments are used, only one of the aerofoils has film cooling holes, the other aerofoil does not have any film cooling holes. For a whole annular turbine section that means that only every other aerofoil on twin vane segments will be film cooled. This is beneficial as film cooling can be limited to a reduced number of aerofoils so that the cooling air consumption is minimised. Also aerodynamic losses are minimised.

Although the invention is illustrated and described in detail by the preferred embodiments, the invention is not limited by the examples disclosed, and other variations can be derived therefrom by a person skilled in the art without departing from the scope of the invention.

The invention claimed is:

1. A method for manufacturing a turbine assembly, which comprises at least two aerofoils that are arranged adjacent towards each other and between two platforms, the at least two aerofoils and the two platforms are formed monolithically, the method comprising:
   processing an external surface of the turbine assembly with a first protection technique that provides a first protection for the at least two adjacent aerofoils, wherein at least one region of an external surface of one aerofoil of the at least two adjacent aerofoils remains unprocessed by the first protection technique, and wherein no region of a second aerofoil of the at least two adjacent aerofoils remains unprocessed by the first protection technique,
   pre-processing of only the at least one region of the one aerofoil of the at least two adjacent aerofoils that will remain unprocessed by the processing with the first protection technique or post-processing of only the at least one region of the one aerofoil of the at least two adjacent aerofoils that remained unprocessed by the processing with the first protection technique with a second protection technique that provides a second protection for the at least one region of the one aerofoil of the at least two adjacent aerofoils that will remain unprocessed or that remained unprocessed by the first protection technique, wherein the first and the second protection techniques differ from one another with said second protection technique providing a surface alteration of the at least one region of the external surface of the one aerofoil of the at least two adjacent aerofoils that will remain unprocessed by the first protection technique or that remained unprocessed by the first protection technique by coating or etching or roughing or by a chemical conversion of the at least one region of the external surface, wherein the second protection technique provides a film cooling effect, and wherein the second aerofoil is free of the film cooling effect.

2. The method according to claim 1, wherein the first protection technique comprises a heat protection technique.

3. The method according to claim 1, wherein the first protection technique is a line-of-sight coating process of the turbine assembly.

4. The method according to claim 1, wherein the at least one region of the external surface of the one aerofoil of the at least two adjacent aerofoils that will remain unprocessed or that remained unprocessed is arranged in a leading edge region of the one aerofoil.

5. The method according to claim 1, wherein the at least one region of the external surface of the one aerofoil of the at least two adjacent aerofoils that will remain unprocessed or that remained unprocessed is arranged in an intersection between a leading edge and a suction side of the one aerofoil.

6. The method according to claim 1, wherein the one aerofoil and the second aerofoil are turbine blades or vanes.

7. A turbine assembly, comprising:

at least two aerofoils that are arranged adjacent towards each other and between two platforms, wherein the at least two aerofoils and the two platforms are formed monolithically, wherein the turbine assembly is manufactured according to the method of claim 1.

* * * * *